(12) United States Patent
Lee et al.

(10) Patent No.: US 8,111,343 B2
(45) Date of Patent: Feb. 7, 2012

(54) COLOR FILTER ON ARRAY DISPLAY SUBSTRATE AND METHOD OF MANUFACTURING THE SAME

(75) Inventors: Young-Wook Lee, Suwon-si (KR); Gug-Rae Jo, Asan-si (KR); Jang-Soo Kim, Yongin-si (KR); Jae-Hyoung Youn, Seoul (KR); Byoung-Joo Kim, Anyang-si (KR); Min-Uk Kim, Seongnam-si (KR); Kyoung-Keun Son, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 404 days.

(21) Appl. No.: 12/361,511

(22) Filed: Jan. 28, 2009

(65) Prior Publication Data
US 2009/0251647 A1 Oct. 8, 2009

(30) Foreign Application Priority Data
Apr. 3, 2008 (KR) .................. 10-2008-0031070

(51) Int. Cl.
*G02F 1/136* (2006.01)
*G02F 1/1335* (2006.01)
*G02F 1/1343* (2006.01)

(52) U.S. Cl. ........... 349/43; 349/106; 349/139; 349/141
(58) Field of Classification Search ................. 349/106, 349/139–141, 43
See application file for complete search history.

(56) References Cited

U.S. PATENT DOCUMENTS

| | | | |
|---|---|---|---|
| 6,400,440 B1 * | 6/2002 | Colgan et al. | 349/160 |
| 7,190,419 B2 * | 3/2007 | Park | 349/43 |
| 2005/0253984 A1 * | 11/2005 | Kim et al. | 349/106 |
| 2008/0043164 A1 * | 2/2008 | Chang et al. | 349/43 |
| 2009/0159888 A1 * | 6/2009 | Park et al. | 257/59 |
| 2009/0191654 A1 * | 7/2009 | Yu et al. | 438/29 |
| 2009/0206343 A1 * | 8/2009 | Choi et al. | 257/72 |

\* cited by examiner

*Primary Examiner* — Huyen Ngo
(74) *Attorney, Agent, or Firm* — Innovation Counsel LLP

(57) ABSTRACT

A display substrate includes a plurality of color filters formed on a base substrate, a gate line formed in a trench defined by at least one of the color filters and extended along a first direction, an insulation layer formed on the color filters and the gate line, a data line formed on the insulation layer to be extended along a second direction crossing the first direction, and pixel electrodes formed on the base substrate having the data line formed thereon.

6 Claims, 14 Drawing Sheets

COLOR FILTER ON ARRAY DISPLAY SUBSTRATE AND METHOD OF MANUFACTURING THE SAME

CROSS-REFERENCE TO RELATED APPLICATIONS

This application claims priority under 35 U.S.C. §119 to Korean Patent Application No. 2008-31070, filed on Apr. 3, 2008 in the Korean Intellectual Property Office (KIPO), the contents of which are herein incorporated by reference in their entirety.

BACKGROUND OF THE INVENTION

1. Field of the Invention

Example embodiments of the present invention relate to a display substrate used in a liquid crystal display (LCD) device and a method of manufacturing the display substrate.

2. Description of the Related Art

A liquid crystal display (LCD) device includes a thin-film transistor (TFT) substrate, a color filter substrate and a liquid crystal layer interposed between the TFT substrate and the color filter substrate. The TFT substrate includes a wiring, a TFT, a pixel electrode, etc., that are formed on an insulation substrate to independently drive a plurality of pixels. The color filter substrate includes a color filter layer having color pixels of a red color, a green color and a blue color, and a common electrode facing the pixel electrode.

The display quality of the LCD device may be varied in accordance with the precision of a coupling between the TFT substrate and the color filter substrate. A misalignment, which may be generated when the TFT substrate and the color filter substrate are coupled with each other, may deteriorate the display quality of the LCD device. In order to prevent the display quality of the LCD device from being deteriorated due to the misalignment, a color filter on array (COA) type LCD device and an array on color filter (AOC) type LCD device have been developed. In the COA type LCD device, a red color filter, a green color filter and a blue color filter are formed. In the AOC type LCD device, a TFT and a pixel electrode are formed on a substrate having a red color filter, a green color filter and a blue color filter formed thereon.

As LCD devices are becoming larger and higher resolutions are required, technology development which improves the charging ability and the driving margin of the TFT is essential. In order to minimize a resistance-capacitance (RC) delay of a wiring formed on the TFT substrate, various low resistance wiring has been developed.

SUMMARY OF THE INVENTION

Example embodiments of the present invention provide a display substrate capable of realizing a low resistance wiring and a high aperture ratio.

Example embodiments of the present invention provide a method of manufacturing the above-mentioned display substrate.

According to one aspect of the present invention, a display substrate includes a plurality of color filters, a gate line, an insulation layer, a data line and a plurality of pixel electrodes. The color filters are formed on a base substrate. The gate line is formed in a trench defined by the color filters to be extended along a first direction. The insulation layer is formed on the color filters and the gate line. The data line is formed on the insulation layer to be extended along a second direction crossing the first direction. The pixel electrodes are formed on the base substrate having the data line formed thereon.

According to another aspect of the present invention, there is provided a method of manufacturing a display substrate. In the method, a first metal wiring is formed in a trench defined by a plurality of color filters on a base substrate. An insulation layer is formed on the color filters and the first metal wiring. A second metal wiring is formed on the insulation layer. A plurality of pixel electrodes is formed on a base substrate having the second metal wiring formed thereon.

According to a display substrate and a method of manufacturing the display substrate, a metal wiring is formed in a trench defined by color filters, so that the resistance of the metal wiring may be decreased and an aperture ratio may be enhanced.

BRIEF DESCRIPTION OF THE DRAWINGS

The above and other features and advantages of the present invention will become more apparent by describing in detailed example embodiments thereof with reference to the accompanying drawings.

DETAILED DESCRIPTION OF THE INVENTION

Figure 1:
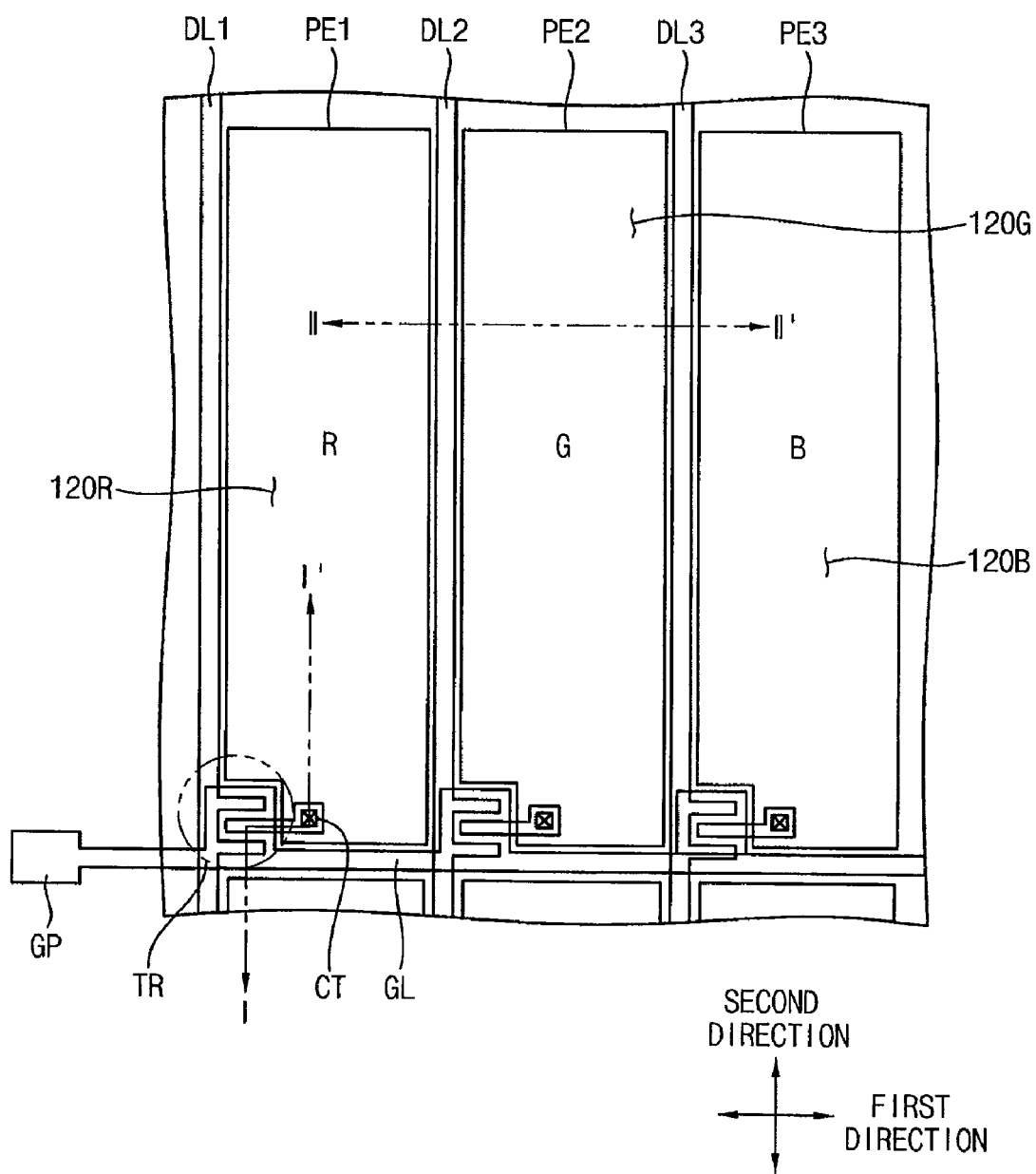
FIG. 1 is a plan view of a display panel according to Embodiment 1 of the present invention.

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Example Embodiment 1

Figure 2:
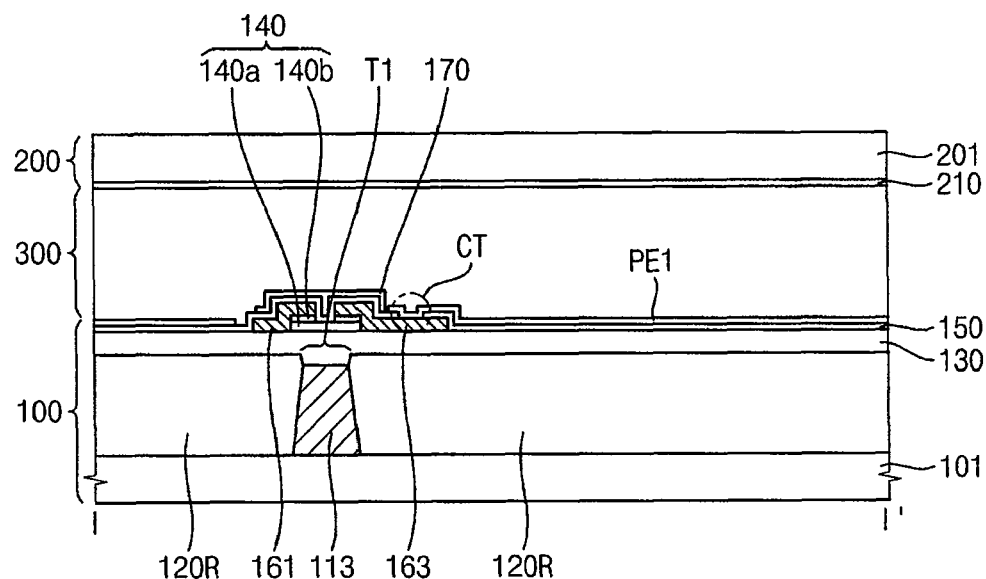
FIG. 2 is a cross-sectional view taken along a line I-I' of FIG. 1.
Figure 3:
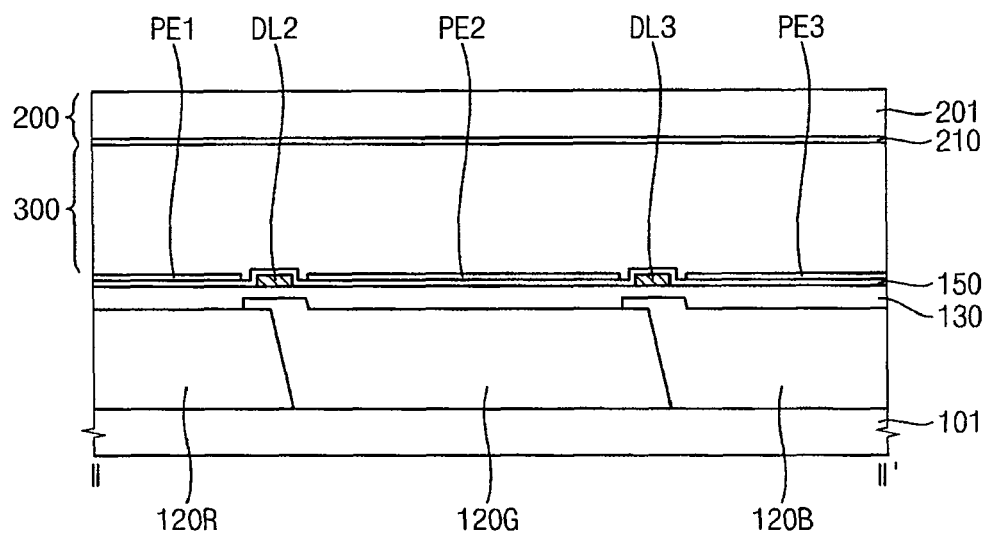
FIG. 3 is a cross-sectional view taken along a line II-II' of FIG. 1.

FIG. 1 is a plan view of a display panel according to Embodiment 1 of the present invention. FIG. 2 is a cross-sectional view taken along a line I-I' of FIG. 1. FIG. 3 is a cross-sectional view taken along a line II-II' of FIG. 1.

Referring to FIGS. 1 to 3, a display panel includes a display substrate 100, and an opposite substrate 200 coupled to the display substrate 100 to receive a liquid crystal layer 300.

The display substrate 100 includes a first base substrate 101. The first base substrate 101 includes a transparent material capable of transmitting light, for example, a glass substrate. The first base substrate 101 includes a red pixel area 'R', a green pixel area 'G' and a blue pixel area 'B'.

Color filters 120R, 120G and 120B, a gate line GL, a gate electrode 113, an insulation layer 130, a semiconductor layer 140, data lines DL1, DL2 and DL3, a source electrode 163, a protective insulation layer 150 and pixel electrodes PE1, PE2 and PE3 are formed on the first base substrate 101.

The color filters 120R, 120G and 120B, which have a thickness of about 1.5 µm to about 2 µm in one example, are formed on the first base substrate 101. The color filters 120R, 120G and 120B are overlapped with each other along a first direction and extended along a second direction crossing the first direction. The color filters 120R, 120G and 120B are overlapped with each other, so that light leakage may be prevented. Moreover, an additional light-blocking layer is not formed on the first base substrate 101, so that an aperture ratio may be enhanced. A trench T1 exposing the first base substrate 101 is formed in at least one of the color filters 120R, 120G and 120B in correspondence with an area where a first metal wiring including the gate line GL and the gate electrode 113 is formed. The trench T1 may have an inverse-tapered shape in one example.

The gate line GL is extended along the first direction to divide the color filters 120R, 120G and 120B extended along the second direction into a plurality of pixel areas. The gate electrode 113 is protruded from the gate line GL. The gate line GL and the gate electrode 113 are formed with a structure which is provided in the trench T1 where portions of the color filters 120R, 120G and 120B are removed. The first metal wiring including the gate line GL and the gate electrode 113 and the color filters 120R, 120G and 120B are overlapped with each other at a boundary area thereof, so that the thickness of the first metal wiring is substantially equal to that of the color filters 120R, 120G and 120B. The first metal wiring may have a thickness between about 1.5 µm to about 2 µm in one example. A gate pad GP extended from the gate line GL is formed at an end portion of the gate line GL.

The first metal wiring may have a storage wiring (not shown) formed in the pixel areas R, G and B. The storage wiring may be also inserted in the trench defined by the color filters 120R, 120G and 120B. That is, the pixel electrode PE1, PE2 and PE3 overlapped with the storage wiring define a storage capacitor at the pixel area R, G and B, respectively.

The insulation layer 130 is formed on the first metal wiring and the color filters 120R, 120G and 120B to planarize the display substrate 100. Moreover, the insulation layer 130 may insulate the semiconductor layer 140 from the gate electrode 113. Furthermore, the insulation layer 130 is formed to cover the color filters 120R, 120G and 120B, so that impurities generated from the color filters 120R, 120G and 120B may be prevented from flowing into the liquid crystal layer 300. The first insulation layer 130 may have an inorganic material or an organic material.

The semiconductor layer 140 is formed on the insulation layer 130 in correspondence with the gate electrode 113. The semiconductor layer 140 may include an active layer 140a doped with impurities and a resistive contact layer 140b formed on the active layer 140a.

The data lines DL1, DL2 and DL3 are extended along the second direction to cross the gate line GL. For example, the data lines DL1, DL2 and DL3 are formed on an overlapping area of the color filters 120R, 120G and 120B arranged along the first direction, respectively.

The source electrode 161 is protruded from the data line DL to overlap with the semiconductor layer 140. The drain electrode 163 is spaced apart from the source electrode 161 to be overlapped with the semiconductor layer 140.

The protective insulation layer 150 is formed on a second metal wiring including the data line DL, the source electrode 161 and the drain electrode 163. The protective insulation layer 150 protects the semiconductor layer 140 exposed by the source electrode 161 and the drain electrode 163, and insulates the pixel electrode PE1, PE2 and PE3 that are formed on the second metal wiring from the second metal wiring.

The pixel electrodes PE1, PE2 and PE3 are formed on the pixel area R, G and B on the protective insulation layer 150, respectively. The pixel electrodes PE1, PE2 and PE3 may have a rectangular shape having a longer side along the second direction and a shorter side along the first direction.

For example, the pixel electrode PE1 makes contact with the drain electrode 163 through a contact hole CT formed through the protective insulation layer 150. Thus, the pixel electrode PE1 is electrically connected to a switching element TR including a gate electrode GE, a semiconductor layer 140, a source electrode 161 and a drain electrode 163.

The light-blocking layer 170 is formed to cover the switching element TR. The light-blocking layer 170 blocks light incident to an interval area between the source electrode 161 and the drain electrode 163 to prevent light leakage current from being generated.

The opposite substrate 200 includes a second base substrate 201. A common electrode 210 is formed on the second base substrate 201. The common electrode 210 is an opposite electrode of the pixel electrodes PE1, PE2 and PE3 formed on the display substrate 100.

FIGS. 4 to 8 are cross-sectional views illustrating a manufacturing process of the display substrate of FIG. 2.

Figure 4:
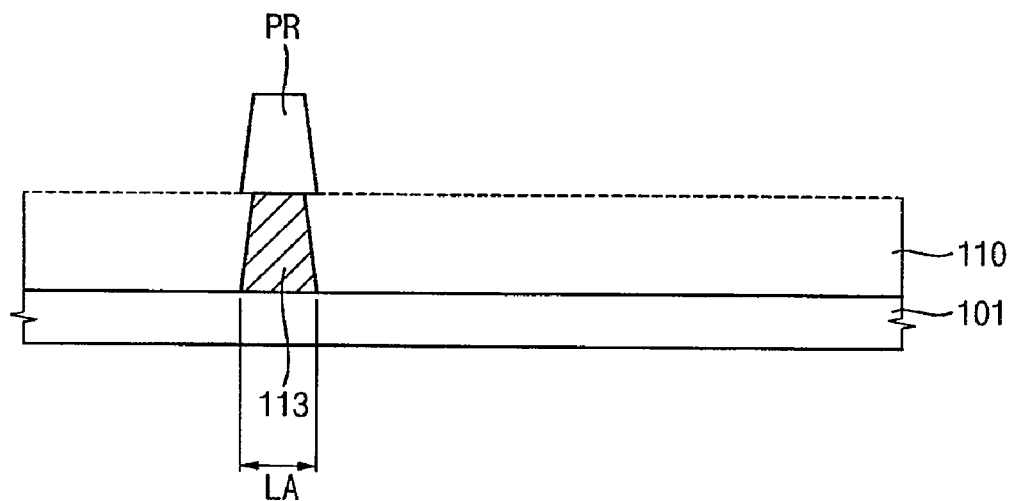
FIGS. 4 to 8 are cross-sectional views illustrating a manufacturing process of the display substrate of FIG. 2.

Referring to FIGS. 2 and 4, a first metal layer 110 of a larger thickness is formed on a first base substrate 101.

The first metal layer 110 may include, for example, a metallic material including at least one selected from the group consisting of molybdenum (Mo), molybdenum nitride (MoN), molybdenum niobium (MoNb), molybdenum (Mo) alloy, copper (Cu), copper (Cu) alloy, copper-molybdenum (CuMo) alloy, aluminum (Al), aluminum (Al) alloy, silver (Ag) and silver (Ag) alloy. For example, the copper alloy may include copper-manganese (CuMn) alloy having a self protecting function. The copper-manganese (CuMn) alloy may have a function that prevents oxidation of copper and atomic migration from being generated.

The thickness of the first metal layer 110 may be about 1.5 μm to about 2 μm. A photoresist layer is formed on the first metal layer 110, and then the photoresist layer is patterned so that a photoresist pattern PR remains in correspondence with a wiring area LA having the first metal wiring formed thereon.

Then, the first metal layer 110 is patterned by using the photoresist pattern PR to form the first metal wiring. The first metal wiring includes the gate line GL and the gate electrode 113. In FIGS. 2 and 4, the gate electrode 113 is shown as an example of the first metal wiring.

Figure 5:
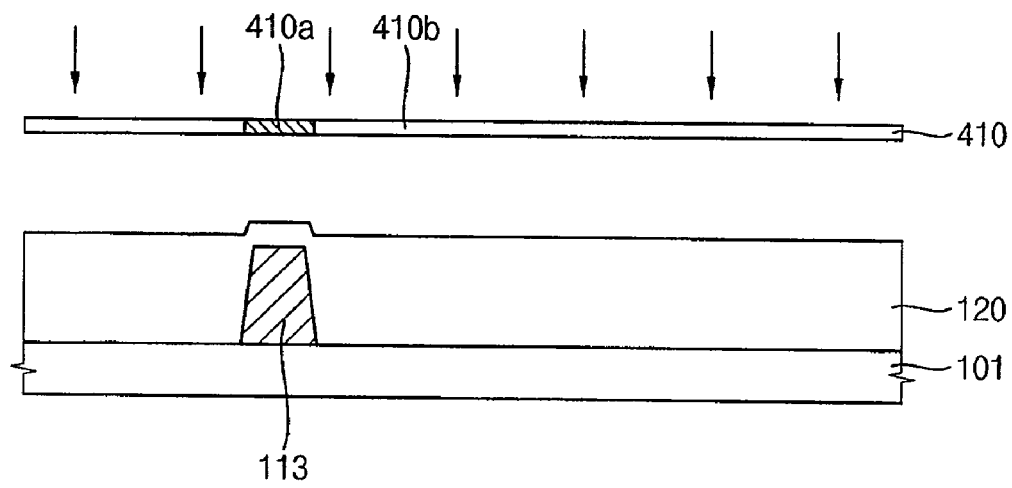

Referring to FIGS. 2 and 5, a color photoresist layer 120 is formed on the first base substrate 101 having the gate electrode 113 formed thereon. A mask 410 having a light-blocking portion 410a and a light-transmitting portion 410b is disposed on the first base substrate 101 having the color photoresist layer 120.

The light-blocking portion 410a is disposed in an area of the gate electrode 113, that is, the wiring area LA, and the light-transmitting portion 410b is disposed in an area of the color filters 120R, that is, the pixel area R. Thus, the color photoresist layer 120 of an exposed area, that is, the pixel area R, remains, and the color photoresist layer 120 of the wiring area LA is removed to expose the gate electrode 113. The color photoresist layer 120 may include a negative photoresist material that is cured by light.

Figure 6:
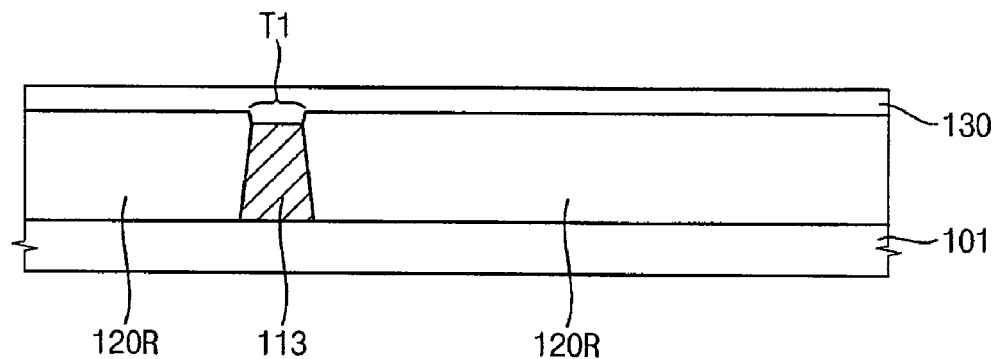

Referring to FIGS. 2 and 6, the color filter 120R formed in the pixel area R is formed adjacent to a side surface of the gate electrode 112. As a result, the gate electrode 113 is provided in a trench T1 having an inverse-tapered shape formed between the adjacent color filters 120R. The thickness of the gate electrode 113 and that of the color filter 120R may be substantially equal to each other.

The insulation layer 130 is formed on the first base substrate 101 having the color filter 120R to planarize and insulate the first base substrate 101.

Figure 7:
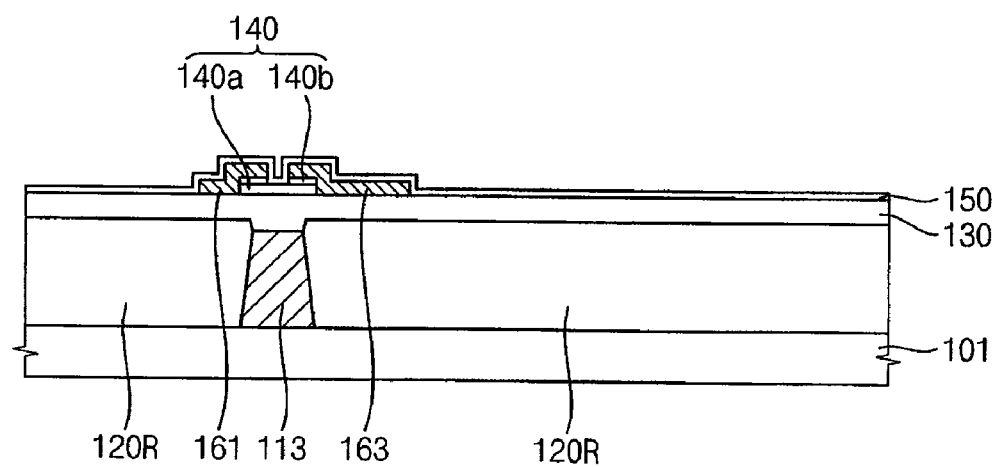

Referring to FIGS. 2 and 7, a semiconductor layer 140 is formed on the insulation layer 130 in correspondence with the gate electrode 113. The semiconductor layer 140 may include an active layer 140a doped with impurities and a resistive contact layer 140b formed on the active layer 140a.

A second metal layer is formed on the first base substrate 101 having the semiconductor layer 140 formed thereon. The second metal layer is patterned by using a photoresist pattern to form a second metal wiring including the data line DL, the source electrode 161 and the drain electrode 163. The protective insulation layer 150 is formed on the first base substrate 101 having the second metal wiring formed thereon.

Figure 8:
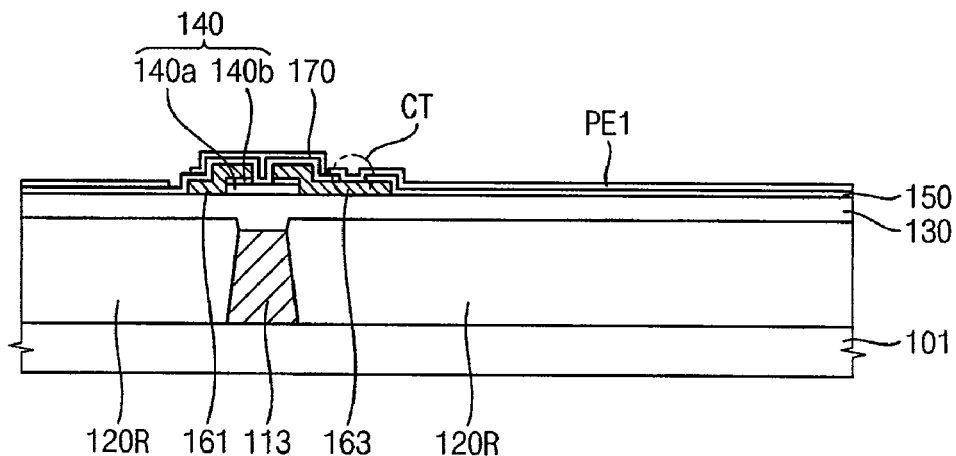

Referring to FIGS. 2 and 8, the protective insulation layer 150 is patterned to form a contact hole CT exposing the drain electrode 163. A transparent conductive layer is formed on the protective insulation layer 150 having the contact hole CT formed therethrough, and then the transparent conductive layer is patterned to form the pixel electrode PE1 contacting the drain electrode 163 through the contact hole CT.

Then, the light-blocking layer 170 is formed to cover the switching element TR. In one example, the light-blocking layer 170 is formed before the pixel electrode PE1 is formed. In another example, the light-blocking layer 170 may be omitted.

Example Embodiment 2

Figure 9:
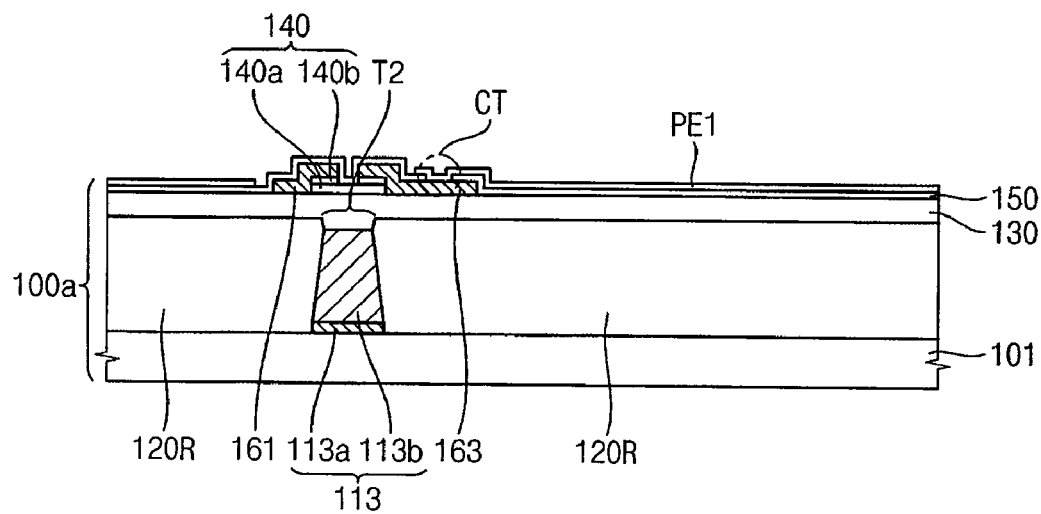
FIG. 9 is a cross-sectional view of a display substrate according to Embodiment 2 of the present invention.

FIG. 9 is a cross-sectional view of a display substrate according to Embodiment 2 of the present invention. The display substrate according to this embodiment is substantially the same as the display substrate of Embodiment 1 except for at least a first metal wiring including a seed layer and a plating layer. Thus, the same reference numerals will be used to refer to the same or like parts as those described in Embodiment 1, and any further explanation concerning the above elements will be omitted.

Referring to FIGS. 1 and 9, the display substrate 100a includes color filters 120R, 120G and 120B, and a first metal wiring including a seed layer and a plating layer. The first metal wiring is provided in a trench T2 having an inverse-tapered shape formed between the adjacent color filters 120R, 120G and 120B.

The first metal wiring includes a gate line GL and a gate electrode of a switching element TR extruded from the gate line GL. For example, the gate electrode 113 may include a seed layer 113a and a plating layer 113b formed on the seed layer 113a. The gate electrode 113 is provided in the trench T2 defined by the color filter 120R, and the gate electrode 113 and the color filter 120R contact with each other at a boundary area thereof.

Figure 10:
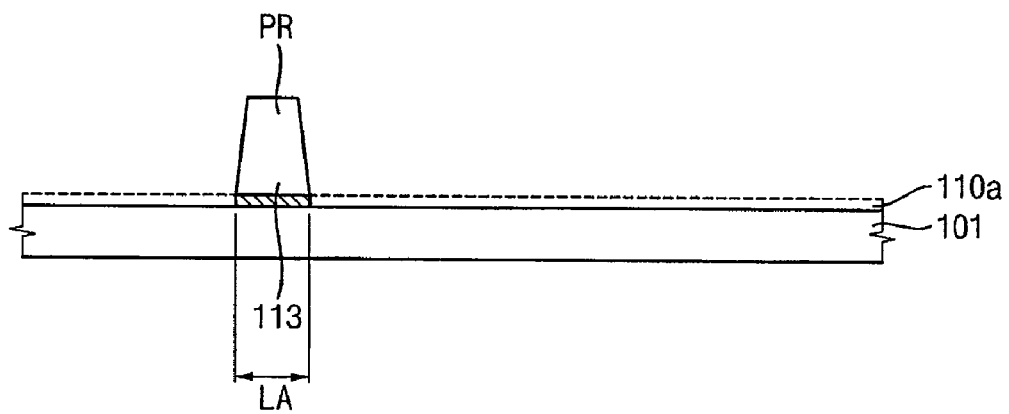
FIGS. 10 to 12 are cross-sectional views illustrating a manufacturing process of the display substrate of FIG. 9.
Figure 11:
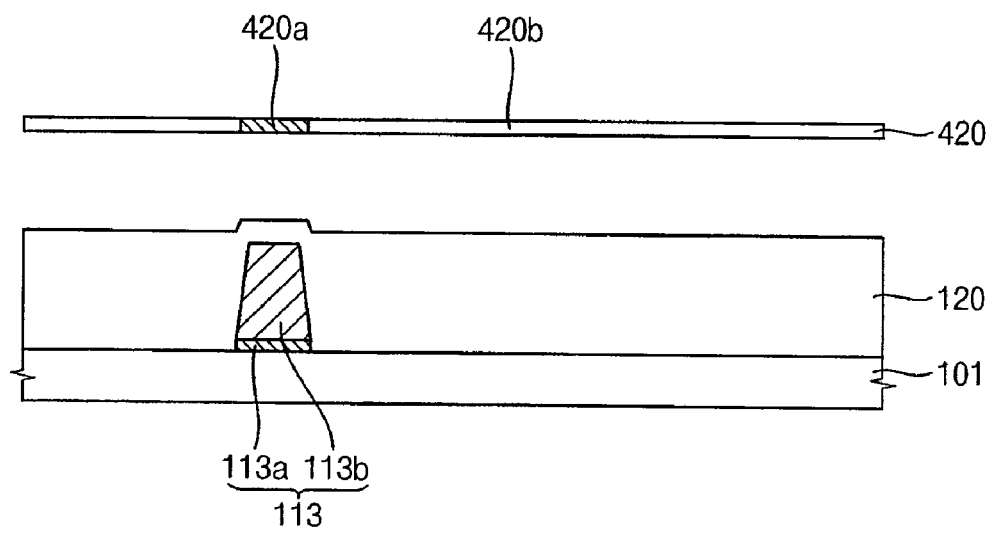
Figure 12:
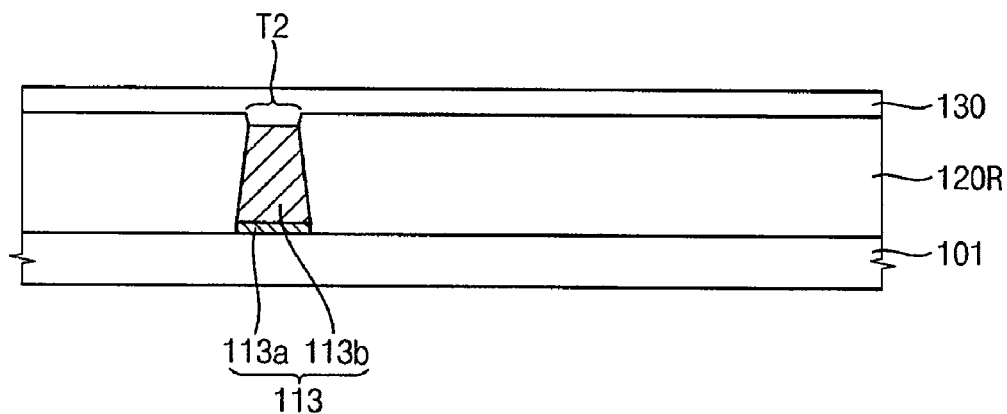

FIGS. 10 to 12 are cross-sectional views illustrating a manufacturing process of the display substrate of FIG. 9.

Referring to FIGS. 9 and 10, a seed metal layer 110a is formed on the base substrate 101. The seed metal layer may include, for example, a metallic material including at least one selected from the group consisting of molybdenum (Mo), molybdenum nitride (MoN), molybdenum niobium (MoNb), molybdenum (Mo) alloy, copper (Cu), copper (Cu) alloy, copper-molybdenum (CuMo) alloy, aluminum (Al), aluminum (Al) alloy, silver (Ag) and silver (Ag) alloy.

A photoresist layer is formed on the seed metal layer 110a. The photoresist layer is patterned so that a photoresist pattern PR remains in a wiring area LA where the metal wiring including the gate line GL and the gate electrode 113 is formed. The seed layer 113a is formed in the wiring area LA by using the photoresist pattern.

Referring to FIGS. 9 and 11, a plating layer 113b is plated on the seed layer 113a by using an electroless plating (ELP) method or an electroplating (EP) method. The plating layer 113b may include copper (Cu). Thus, a first metal wiring, for example, a gate electrode 113 including the seed layer 113a and the plating layer 113b is formed in the wiring area LA.

A color photoresist layer 120 is formed on the first base substrate 101 having the gate electrode 113 formed thereon. A mask 420 having a light-blocking portion 420a and a light-transmitting portion 420b is disposed on the first base substrate 101 having the color photoresist layer 120. The light-blocking portion 410a is disposed in an area of the gate electrode 113, that is, the wiring area LA, and the light-transmitting portion 410b is disposed in an area of the color filters 120R, that is, the pixel area R. Thus, a color filter 120R is formed in an exposed area, that is, the pixel area R.

Referring to FIGS. 9 and 12, the color filter 120R formed in the pixel area R is formed adjacent to a side surface of the gate electrode 113 including the seed layer 113a and the plating layer 113b. As a result, the gate electrode 113 is provided in a trench T2 having an inverse-tapered shape formed between the adjacent color filters 120R. The thickness of the gate electrode 113 and that of the color filter 120R may be substantially equal to each other.

The insulation layer 130 is formed on the first base substrate 101 having the color filter 120R to planarize the first base substrate 101.

The switching element TR, the data line DL and the pixel electrode PE1 are formed on the first base substrate 101 having the insulation layer 130 formed thereon. Processes for forming the switching element TR, the data line DL and the pixel electrode PE1 are substantially the same as the manufacturing processes of the display substrate of Embodiment 1 described with reference to FIGS. 7 and 8, so that any further explanation will be omitted.

Example Embodiment 3

Figure 13:
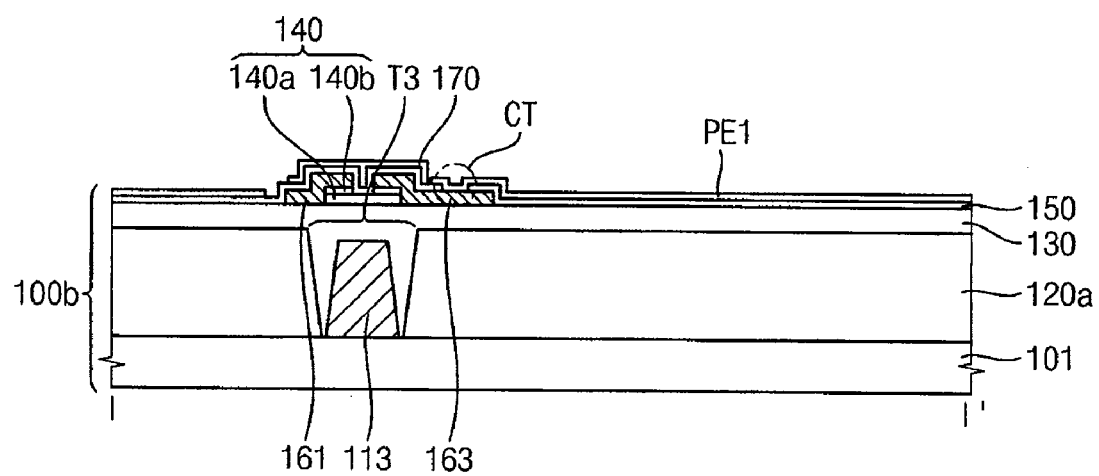
FIG. 13 is a cross-sectional view of a display substrate according to Embodiment 3 of the present invention.

FIG. 13 is a cross-sectional view of a display substrate according to Embodiment 3 of the present invention. The display substrate according to this embodiment is substantially the same as the display substrate of Embodiment 1 except for at least a trench of a forward-tapered shape. Thus, the same reference numerals will be used to refer to the same or like parts as those described in Embodiment 1, and any further explanation concerning the above elements will be omitted.

Referring to FIGS. 1 and 13, the display substrate 100b includes color filters 120R, 120G and 120B, and a first metal wiring. The first metal wiring is provided in a trench T3 having a forward-tapered shape, which is defined by at least one of the color filters 120R, 120G and 120B.

The first metal wiring includes a gate line GL and a gate electrode 113 of a switching element TR that is protruded from the gate line GL. For example, the gate electrode 113 may be provided in the trench T3 defined by the color filter 120R, and the gate electrode 113 and the color filter 120R may be spaced apart from each other at a boundary portion. In other words, side surfaces of gate electrode 113 are not necessarily adjacent the side surfaces of trench T3.

Figure 14:
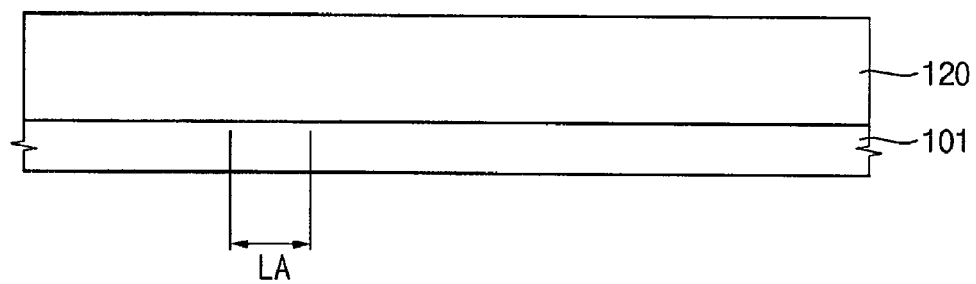
FIGS. 14 to 16 are cross-sectional views illustrating a manufacturing process of the display substrate of FIG. 13.
Figure 15:
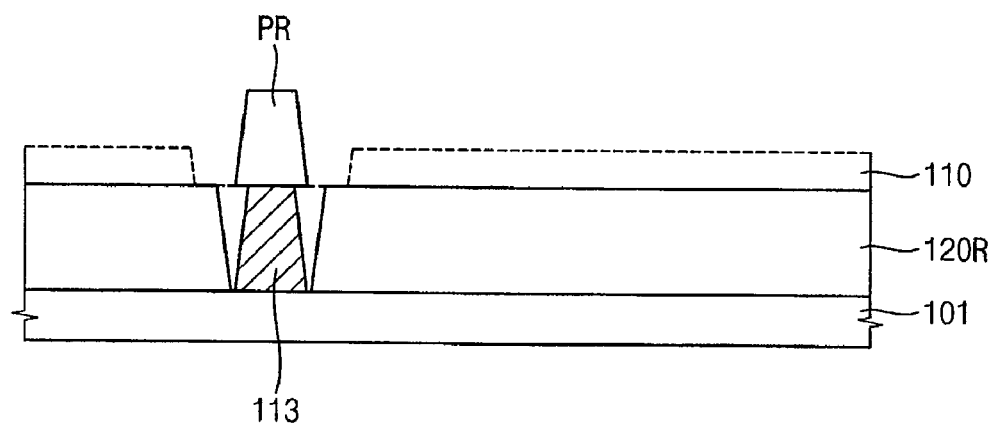
Figure 16:
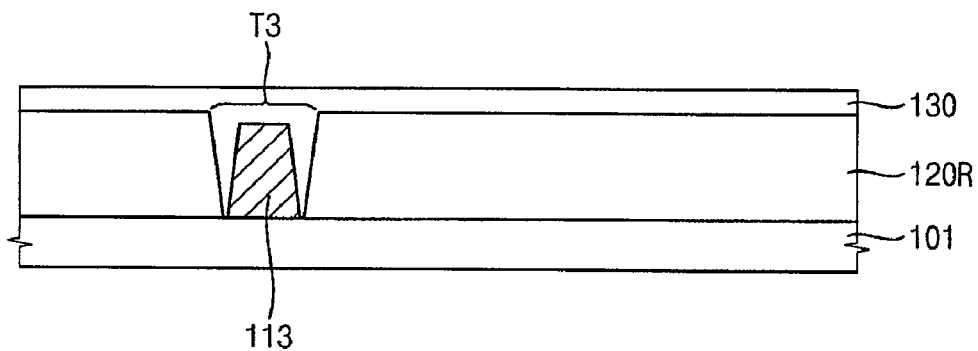

FIGS. 14 to 16 are cross-sectional views illustrating a manufacturing process of the display substrate of FIG. 13.

Referring to FIGS. 13 and 14, a color photoresist layer 120 is formed on the first base substrate 101. A mask 430 is disposed on the first base substrate 101 having the color photoresist layer 120 formed thereon. The mask 430 has a light-blocking portion 430a and a light-transmitting portion 430b. The light-blocking portion 430a is disposed in accordance with a wiring area LA where the first metal wiring is formed, and the light-transmitting portion 430b is disposed in the pixel area R except the wiring area LA.

Referring to FIGS. 13 and 15, the color photoresist layer 120 is patterned by using the mask 430 to form a color filter 120R in the pixel area R. A trench T3 of a forward-tapered shape is formed through the color filter 120R in accordance with the wiring area LA.

A first metal layer 110 is formed on the first base substrate 101 having the trench T3 formed therethrough. The first metal layer 110 is formed to a thickness sufficient to fill up the trench T3. A photoresist layer is formed on the first metal layer 110, and then the photoresist layer is patterned to form a photoresist pattern PR in the wiring area LA. The first metal layer 110 is patterned by using the photoresist pattern PR to form the first metal wiring including the gate line GL and the gate electrode 113.

Referring to FIGS. 13 and 16, the gate electrode 113 is provided in the trench T3 which is formed through the color filter 120R to have a thickness substantially equal to that the color filter 120R. The gate electrode 113 may have a thickness of about 1.5 µm to about 2 µm.

The gate electrode 113 and the color filter 120R are spaced apart from each other in accordance with process characteristics at a boundary portion. The insulation layer 130 is formed on the first base substrate 101 having the color filter 120R to planarize the first base substrate 101.

The switching element TR, the data line DL and the pixel electrode PE1 are formed on the first base substrate 101 having the insulation layer 130 formed thereon. Processes for forming the switching element TR, the data line DL and the pixel electrode PE1 are substantially the same as the manufacturing processes of the display substrate of Embodiment 1 described with reference to FIGS. 7 and 8, so that any further explanation will be omitted.

Example Embodiment 4

Figure 17:
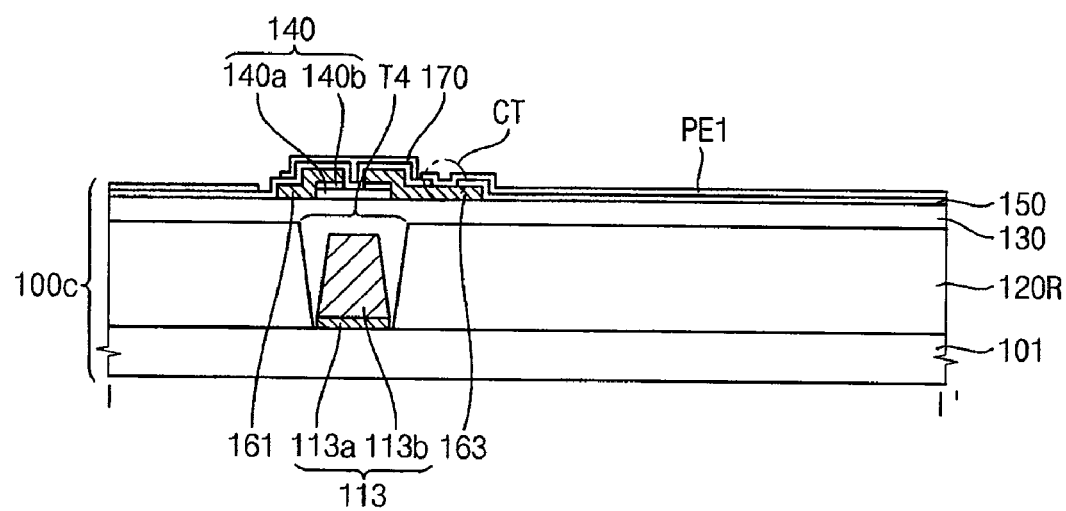
FIG. 17 is a cross-sectional view of a display substrate according to Embodiment 4 of the present invention.

FIG. 17 is a cross-sectional view of a display substrate according to Embodiment 4 of the present invention. The display substrate according to this embodiment is substantially the same as the display substrate of Embodiment 3 except for at least a first metal wiring including a seed layer and a plating layer. Thus, the same reference numerals will be used to refer to the same or like parts as those described in Embodiment 3, and any further explanation concerning the above elements will be omitted.

Referring to FIGS. 1 and 17, the display substrate 100c includes color filters 120R, 120G and 120B, and a first metal wiring including a seed layer and a plating layer. The first metal wiring is provided in a trench T4 having a forward-tapered shape formed between the adjacent color filters 120R, 120G and 120B.

The first metal wiring includes a gate line GL and a gate electrode 113 of a switching element TR extruded from the gate line GL. For example, the gate electrode 113 may include a seed layer 113a and a plating layer 113b formed on the seed layer 113a. The gate electrode 113 is provided in the trench T4 of the forward-tapered shape, and the gate electrode 113 and the color filter 120R are spaced apart from each other at a boundary portion of the color filter 120R.

Figure 18:
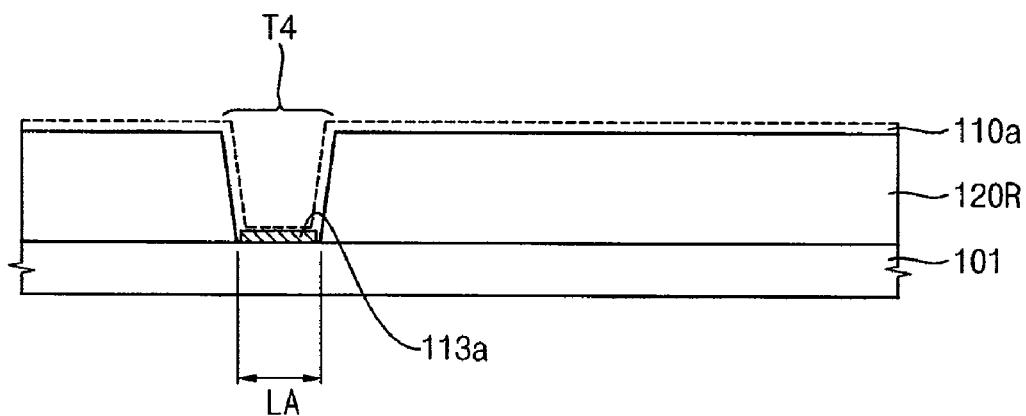
FIGS. 18 to 20 are cross-sectional views showing a manufacturing process of the display substrate of FIG. 17.
Figure 19:
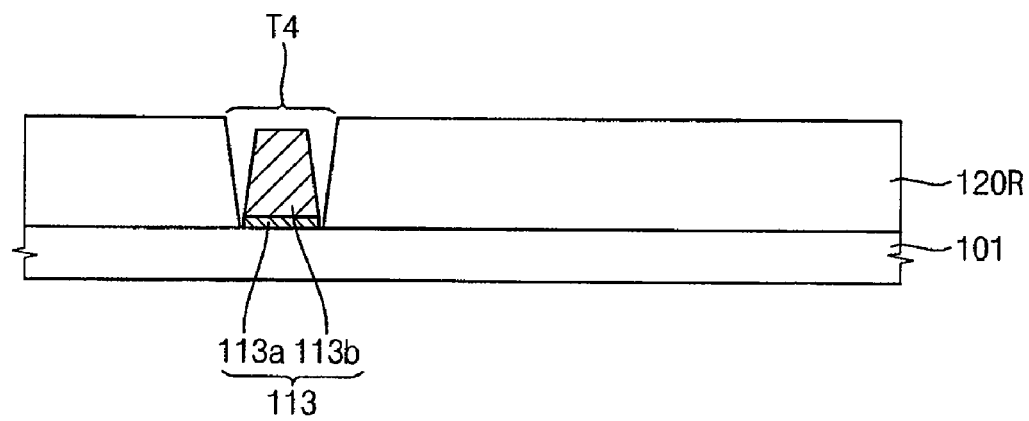
Figure 20:
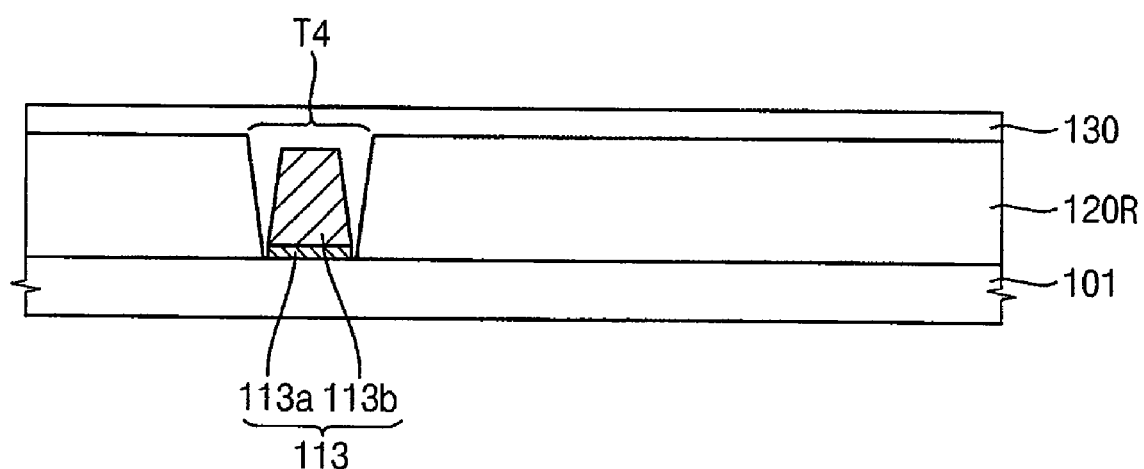

FIGS. 18 to 20 are cross-sectional views showing a manufacturing process of the display substrate of FIG. 17.

Referring to FIGS. 17 and 18, a color filter 120R having a trench T4 of a forward-tapered shape defined therethrough is formed on the first base substrate 101. The color filter 120R is formed by substantially the same process as that described with reference to FIG. 14. The trench T4 is formed in a wiring area LA having a first metal wiring including the gate line GL and the gate electrode 113.

A seed metal layer 110a is formed on the first base substrate 101 having the color filter 120R formed thereon. The seed metal layer 110a is inserted into the trench T4. The seed metal layer 110a is patterned to form a seed layer 113a in the wiring area LA. The seed layer 113a is formed by substantially the same process as that described with reference to FIG. 10.

Referring to FIGS. 17 and 19, a plating layer 113b is plated on the seed layer 113a by using an electroless plating (ELP) method or an electroplating (EP) method. The plating layer 113b may include copper (Cu). Thus, a first metal wiring, for example, a gate electrode 113 including the seed layer 113a and the plating layer 113b is formed through the trench T4. The gate electrode 113 is provided in the trench T4 having the color filter 120R formed therethrough to be formed with a thickness substantially equal to that the color filter 120R. The gate electrode 113 is formed with a thickness of about 1.5 μm to about 2 μm.

Referring to FIGS. 17 and 20, the gate electrode 113 and the color filter 120R are spaced apart from each other in accordance with process characteristics at a boundary portion. The insulation layer 130 is formed on the first base substrate 101 having the color filter 120R to planarize the first base substrate 101.

The switching element TR, the data line DL and the pixel electrode PE1 are formed on the first base substrate 101 having the insulation layer 130 formed thereon. Processes for forming the switching element TR, the data line DL and the pixel electrode PE1 are substantially the same as the manufacturing processes of the display substrate of Embodiment 1 described with reference to FIGS. 7 and 8, so that any further explanation will be omitted.

Example Embodiment 5

Figure 21:
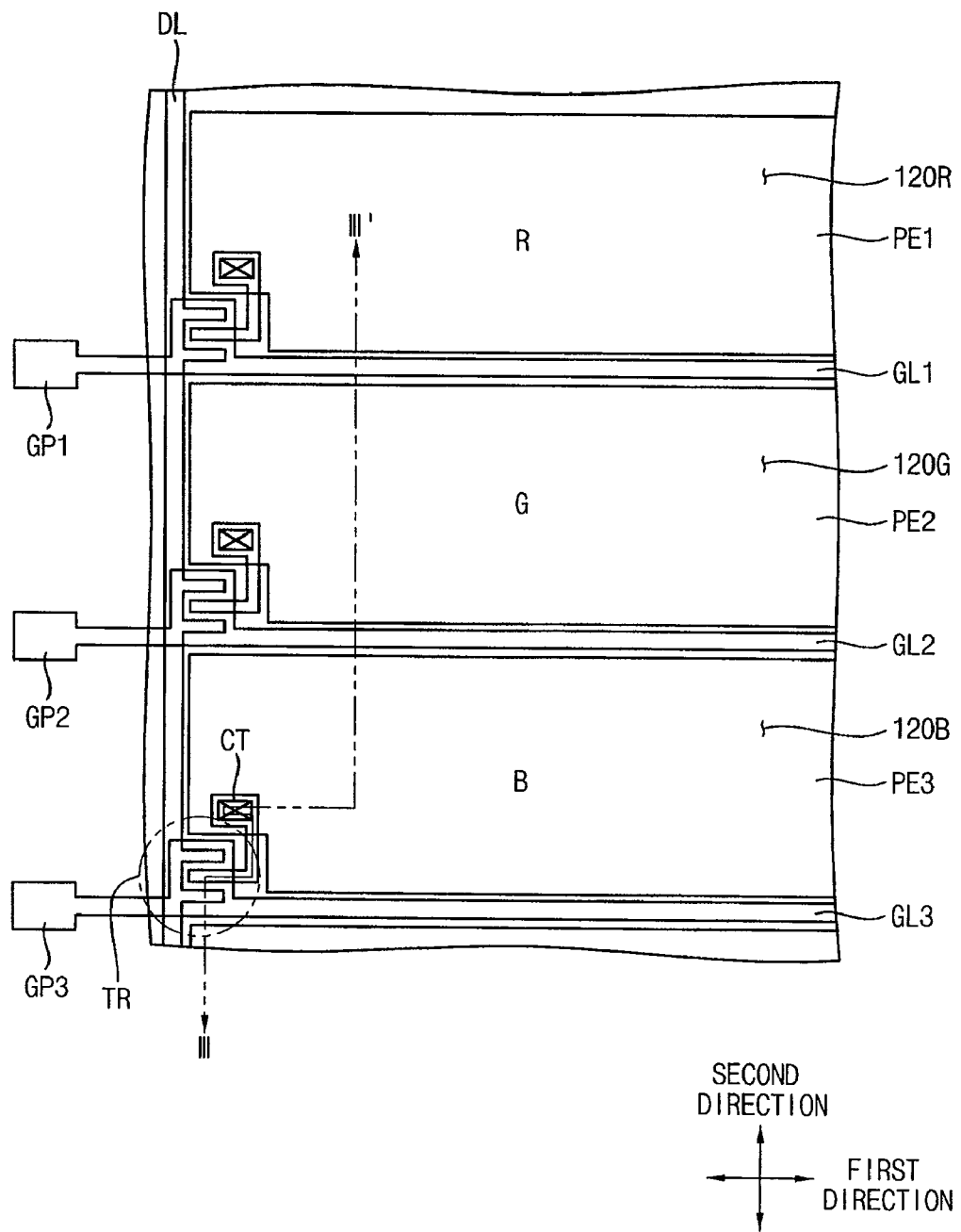
FIG. 21 is a plan view of a display panel according to Embodiment 5 of the present invention.
Figure 22:
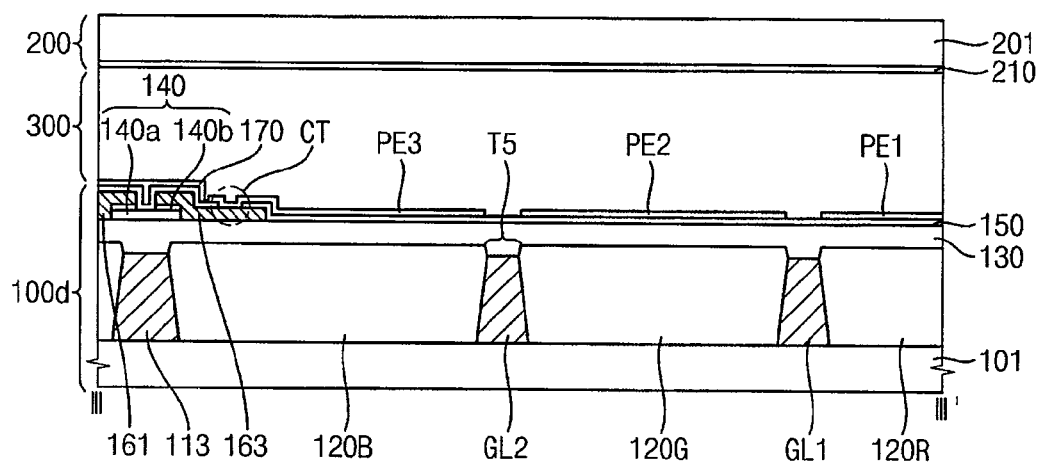
FIG. 22 is a cross-sectional view taken along a line III-III' of FIG. 21.

FIG. 21 is a plan view of a display panel according to Embodiment 5 of the present invention. FIG. 22 is a cross-sectional view taken along a line III-III' of FIG. 21. The display substrate according to this embodiment is substantially the same as the display substrate of Embodiment 1 except for at least a plurality of color filters extended along a first direction. Thus, the same reference numerals will be used to refer to the same or like parts as those described in Embodiment 1, and any further explanation concerning the above elements will be omitted.

Referring to FIGS. 21 and 22, the display panel includes a display substrate 100d, and an opposite substrate 200 coupled with the display substrate 100d to receive a liquid crystal layer 300. The opposite substrate 200 is substantially the same as the opposite substrate 200 of FIG. 2, so that any further explanation will be omitted.

The display substrate 100d includes a first base substrate 101. Color filters 120R, 120G and 120B, gate lines GL1, GL2 and GL3, a gate electrode 113, an insulation layer 130, a semiconductor layer 140, a data line DL, a source electrode 161, a drain electrode 163, a protective insulation layer 150 and pixel electrodes PE1, PE2 and PE3 are formed on the first base substrate 101.

The color filters 120R, 120G and 120B, which have a thickness of about 1.5 μm to about 2 μm, are formed on the first base substrate 101. The color filters 120R, 120G and 120B arte overlapped with each other along a second direction and extended along a first direction crossing the second direction. The color filters 120R, 120G and 120B are overlapped with each other, so that light leakage may be prevented. Moreover, an additional light-blocking layer is not formed on the first base substrate 101, so that an aperture ratio may be enhanced. A trench T5 exposing the first base substrate 101 is formed in the color filters 120R, 120G and 120B in correspondence with an area where a first metal wiring including the gate line GL and the gate electrodes GL1, GL2 and GL3 is formed. The trench T5 may have an inverse-tapered shape.

The gate lines GL1, GL2 and GL3 are extended along the first direction, and are formed between the color filters 120R, 120G and 120B arranged along the second direction, respectively. The gate electrode 113 is protruded from the gate line GL3. The gate lines GL1, GL2 and GL3 and the gate electrode 113 are formed with a structure where is provided in the trench T5 where the color filters 120R, 120G and 120B are removed. The first metal wiring including the gate lines GL1, GL2 and GL3 and the gate electrode 113 and the color filters 120R, 120G and 120B contact to each other at a boundary portion thereof. The thickness of the first metal wiring is substantially equal to that of the color filters 120R, 120G and 120B. The first metal wiring may have a thickness of about 1.5 μm to about 2 μm. Gate pads GP1, GP2 and GP3 extended from the gate lines GL1, GL2, GL3, respectively, are formed at end portions of the gate lines GL1, GL2, GL3.

The insulation layer 130 is formed on the first metal wiring and the color filters 120R, 120G and 120B to planarize the display substrate 100. Moreover, the insulation layer 130 may insulate the semiconductor layer 140 from the gate electrode 113. Furthermore, the insulation layer 130 is formed to cover the color filters 120R, 120G and 120B, so that impurities generated from the color filters 120R, 120G and 120B may be prevented from flowing into the liquid crystal layer 300.

The semiconductor layer 140 is formed on the insulation layer 130 in correspondence with the gate electrode 113. The semiconductor layer 140 may include an active layer 140a doped with impurities and a resistive contact layer 140b formed on the active layer 140a.

The data line DL is extended along the second direction to cross the gate lines GL1, GL2 and GL3.

The source electrode 161 is protruded from the data line DL to overlap with the semiconductor layer 140. The drain electrode 163 is spaced apart from the source electrode 161 to be overlapped with the semiconductor layer 140.

The protective insulation layer 150 is formed on a second metal wiring including the data line DL, the source electrode 161 and the drain electrode 163. The second metal wring may include a storage wiring (not shown) extended along a second direction in parallel with the data line DL. The storage wiring overlaps with the pixel electrodes PE1, PE2 and PE3 to form a storage capacitor in the pixel areas R, G and B.

The protective insulation layer 150 protects the semiconductor layer 140 exposed by the source electrode 161 and the drain electrode 163, and insulates the pixel electrode that is formed on the second metal wiring from the second metal wiring.

The pixel electrodes PE1, PE2 and PE3 are formed on the protective insulation layer 150. The pixel electrodes PE1, PE2 and PE3 may have a rectangular shape having a long side along the first direction and a short side along the second direction. For example, the pixel electrode PE3 makes contact with the drain electrode 163 through a contact hole CT formed through the protective insulation layer 150. Thus, the pixel electrode PE3 is electrically connected to a switching element TR including a gate electrode GE, a semiconductor layer 140, a source electrode 161 and a drain electrode 163.

The light-blocking layer 170 is formed to cover the switching element TR. The light-blocking layer 170 blocks light incident to an interval area between the source electrode 161 and the drain electrode 163 to prevent light leakage current from being generated.

A method of manufacturing the display substrate 100d will be described with reference to FIGS. 4 to 8.

As described with reference to FIG. 4, a first metal wiring is formed on the first base substrate 101 in the wiring area LA by using a photoresist pattern PR. The first metal wiring includes the gate lines GL1, GL2 and GL3, and the gate electrode 113. As shown in FIG. 5, a red color filter 120R is formed by using a color photoresist layer 120 on the first base substrate 101 having the gate electrode 113 formed thereon. Using substantially the same process, the different color filters, for example, a green color filter 120G and a blue color filter 120B, may be formed.

Alternatively, the color filters 120R, 120G and 120B may be formed by using an ink-jet method or a gravure printing method. In the ink-jet method, the gate lines GL1, GL2 and GL3 formed on the first base substrate 101 are defined as a partition, and then red, green and blue color inks are jetted to form the color filters 120R, 120G and 120B. The color filters 120R, 120G and 120B formed by the ink-jet method or the gravure printing method may be planarized through a pressing process. When the first base substrate 101 is planarized through the pressing process, the insulation layer 130 is used for an insulation function so that a layer thickness may be thinner.

When the color ink is used for manufacturing the color filters 120R, 120G and 120B, in order to prevent defects such as crosstalk due to the dielectric constant of the color ink, the color ink may have a pigment and a binder containing a silicon (Si)-based material. For example, a binder including a silicon (Si) component, such as a siloxane-based material, is dispersed to simultaneously form a capping layer on a surface of a pigment, so that the dielectric constant of the color ink may be decreased to prevent characteristics of the switching element (TR) from being deteriorated.

Accordingly, as described with reference to FIG. 6, the color filters 120R, 120G and 120B are formed to contact a side surface of the gate electrodes GL1, GL2 and GL3. As a result, the gate electrodes GL1, GL2 and GL3 are provided in a trench T5 having an inverse-tapered shape formed between the adjacent color filters 120R, 120G and 120B. The thickness of the first metal wiring including the gate lines GL1, GL2 and GL3, and the gate electrode 113 may be substantially equal to that of the color filters 120R, 120G and 120B.

The insulation layer 130 is formed on the first base substrate 101 having the color filters 120R, 120G and 120B formed thereon. The switching element TR, the data line DL and the pixel electrodes PE1, PE2 and PE3 are formed on the insulation layer 130.

Example Embodiment 6

Figure 23:
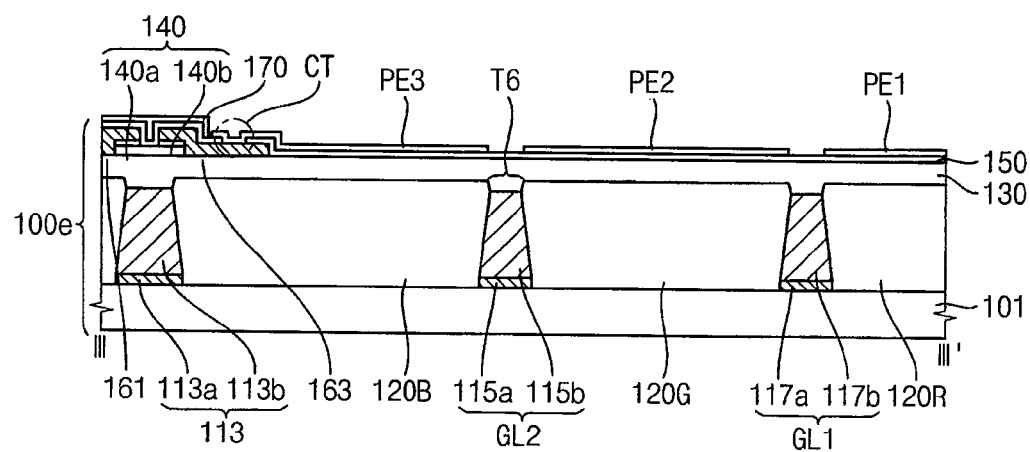
FIG. 23 is a cross-sectional view of a display substrate according to Embodiment 6 of the present invention.

FIG. 23 is a cross-sectional view of a display substrate according to Embodiment 6 of the present invention. The display substrate according to this embodiment is substantially the same as the display substrate of Embodiment 5 except for at least a first metal wiring including a seed layer and a plating layer. Thus, the same reference numerals will be used to refer to the same or like parts as those described in Embodiment 5, and any further explanation concerning the above elements will be omitted.

Referring to FIGS. 21 and 23, the display substrate 100e includes color filters 120R, 120G and 120B, and a first metal wiring including seed layers 113a, 115a and 117a and plating layers 113b, 115b and 117b. The first metal wiring includes gate lines GL1, GL2 and GL3, and a gate electrode 113 of a switching element TR. The first metal wiring is provided in a trench T6 having an inverse-tapered shape defined between the color filters 120R, 120G and 120B.

For example, the gate line GL2 includes a seed layer 115a and a plating layer 115b formed on the seed layer 115a. The gate line GL2 is formed with a structure which is provided in the trench T6 formed between the color filters 120B and 120G, and the gate line GL2 and the color filters 120B and 120G contact with each other at a boundary area thereof.

A method of manufacturing the display substrate 100e will be described with reference to FIGS. 10 to 12.

As described with reference to FIG. 10, a seed metal layer 110a is formed on the base substrate 101. The seed layers 113a, 115a and 117a are formed from the seed metal layer 110a in the wiring area LA by using the photoresist pattern PR.

As described with reference to FIG. 11, plating layers 113b, 115b, 117b are plated on the seed layers 113a, 115a, 117a by using an electroless plating (ELP) method or an electroplating (EP) method. Thus, a first metal wiring, for example, gate electrodes GL1, GL2, GL3 and the gate electrode 113 including the seed layer 113a, 115a and 117a and the plating layer 113b, 115b and 117b are formed in the wiring area LA. Then, the color filter 120R is formed by using the color photoresist layer 120, and using substantially the same process, the different color filters, for example, a green color filter 120G and a blue color filter 120B may be formed.

Alternatively, the color filters 120R, 120G and 120B may be formed by using an ink-jet method or a gravure printing method. In the ink-jet method, the gate lines GL1, GL2 and GL3 formed on the first base substrate 101 are defined as a partition, and then red, green and blue color inks are jetted to form the color filters 120R, 120G and 120B. The color filters 120R, 120G and 120B formed by the ink-jet method or the gravure printing method may be planarized through a pressing process.

When the color ink is used for manufacturing the color filters 120R, 120G and 120B, in order to prevent defects such as crosstalk due to the dielectric constant of the color ink, the color ink may have a pigment and a binder containing a silicon (Si)-based material. For example, a binder including a silicon (Si) component, such as a siloxane-based material, is dispersed to simultaneously form a capping layer on a surface of a pigment, so that the dielectric constant of the color ink may be decreased to prevent characteristics of the switching element (TR) from being deteriorated.

Accordingly, as described with reference to FIG. 12, the color filters 120R, 120G and 120B are formed to contact a side surface of the gate electrodes GL1, GL2 and GL3. As a result, the gate electrodes GL1, GL2 and GL3 are provided in a trench T6 having an inverse-tapered shape formed between the adjacent color filters 120R, 120G and 120B. The thickness of the first metal wiring including the gate lines GL1, GL2 and GL3, and the gate electrode 113 may be substantially equal to that of the color filters 120R, 120G and 120B.

The insulation layer 130 is formed on the first base substrate 101 having the color filters 120R, 120G and 120B. The switching element TR, the data line DL, the pixel electrodes PE1, PE2 and PE3 and the light-blocking layer 170 are formed on the insulation layer 130.

Example Embodiment 7

Figure 24:
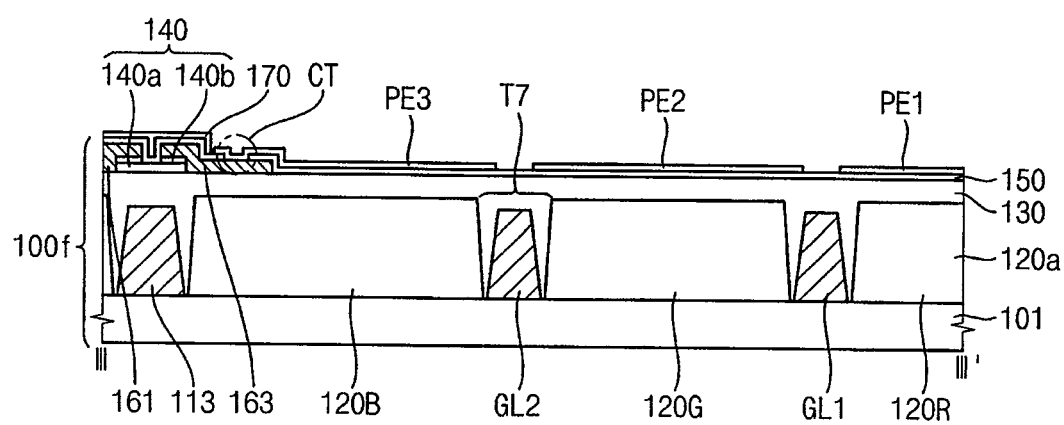
FIG. 24 is a cross-sectional view of a display substrate according to Embodiment 7 of the present invention.

FIG. 24 is a cross-sectional view of a display substrate according to Embodiment 7 of the present invention. The display substrate according to this embodiment is substantially the same as the display substrate of Embodiment 4 except for at least a trench of a forward-tapered shape. Thus, the same reference numerals will be used to refer to the same or like parts as those described in Embodiment 4, and any further explanation concerning the above elements will be omitted.

Referring to FIGS. 21 and 24, the display substrate 100f includes color filters 120R, 120G and 120B, and a first metal wiring. The first metal wiring includes gate lines GL1, GL2 and GL3, and a gate electrode 113 of a switching element TR. The first metal wiring is inserted into a trench T7 having a forward-tapered shape defined between the color filters 120R, 120G and 120B.

For example, the gate line GL2 may be inserted into the trench T7 defined between the color filters 120R and 120G, and the gate line GL2 and the color filters 120B and 120G may be spaced apart from each other at a boundary portion thereof.

A method of manufacturing the display substrate 100f will be described with reference to FIGS. 14 to 16.

As described with reference to FIG. 14, the color filter 120R is formed on the first base substrate 101 by using the color photoresist layer 120, and using substantially the same process, the different color filters, for example, a green color filter 120G and a blue color filter 120B may be formed. A trench T7 of a forward-tapered shape is formed in an adjacent area of the color filters 120R, 120G and 120B, that is, in accordance with a wiring area LA where the first metal wiring is formed.

As described with reference to FIG. 15, a first metal layer 110 is formed on the first base substrate 101 having the trench T7 formed therethrough. The first metal layer 110 is patterned through a photoresist pattern PR to form the first metal wiring including the gate lines GL1, GL2 and GL3, and the gate electrode 113 in the wiring area LA.

Therefore, as described with reference to FIG. 16, the gate line GL2 is inserted into the trench T7 formed between the color filters 120G and 120B. The thickness of the gate line GL2 may be substantially equal to that of the color filters 120G and 120B. The gate line GL2 and the color filters 120G and 120B are spaced apart from each other in accordance with process characteristics at a boundary portion thereof. Then, an insulation layer 130 is formed on the first base substrate 101, and then the switching element TR, the data line DL, the pixel electrodes PE1, PE2 and PE3, and the light-blocking layer 170 are formed on the insulation layer 130.

Example Embodiment 8

Figure 25:
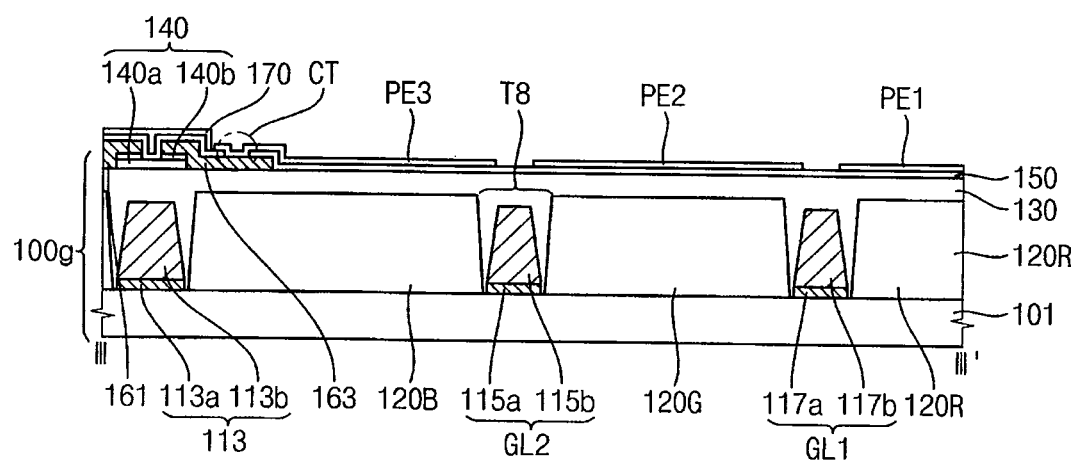
FIG. 25 is a cross-sectional view of a display substrate according to Embodiment 8 of the present invention.

FIG. 25 is a cross-sectional view of a display substrate according to Embodiment 8 of the present invention. The display substrate according to this embodiment is substantially the same as the display substrate of Embodiment 7 except for at least a first metal wiring including a seed layer and a plating layer. Thus, the same reference numerals will be used to refer to the same or like parts as those described in Embodiment 7, and any further explanation concerning the above elements will be omitted.

Referring to FIGS. 21 and 25, the display substrate 100g includes color filters 120R, 120G and 120B, and a first metal wiring including seed layers 113a, 115a and 117a and plating layers 113b, 115b, 117b. The first metal wiring includes gate lines GL1, GL2 and GL3 and a gate electrode 113 of a switching element TR. The first metal wiring is inserted into a trench T8 having a forward-tapered shape defined between the color filters 120R, 120G and 120B.

For example, the gate line GL2 includes a seed layer 115a and a plating layer 115b formed on the seed layer 115a. The gate line GL2 may be inserted into the trench T8 defined between the color filters 120B and 120G, and the gate line GL2 and the color filters 120B and 120G may be spaced apart from each other at a boundary portion thereof.

A method of manufacturing the display substrate 100g will be described with reference to FIGS. 18 to 20.

As described with reference to FIGS. 18 and 19, color filters 120R, 120G and 120B having a trench T8 of a forward-tapered shape defined thereon are formed on the first base substrate 101 in accordance with a wiring area LA where the first metal wiring is formed. The first metal wiring including seed layer 113a, 115a and 117a, and plating layers 113b, 115b and 117b is formed through the trench T8 formed between the color filters 120R, 120G and 120B.

Accordingly, as described with reference to FIG. 20, the gate line GL2 is inserted into the trench T8 which is formed between the color filters 120G and 120B to have a thickness substantially equal to that the color filters 120G and 120B. The gate line GL2 and the color filters 120G and 120B are spaced apart from each other in accordance with process characteristics at a boundary portion thereof. Then, an insulation layer 130 is formed on the first base substrate 101 to planarize the first base substrate 101. The switching element TR, the data line DL, the pixel electrodes PE1, PE2 and PE3, and the light-blocking layer 170 are formed on the insulation layer 130.

In the above embodiments, it is described that the gate electrode and the gate line are formed from the same metal layer. Alternatively, the gate electrode and the gate line may be formed from the different metal layers by using an additional mask process, and then the gate electrode and the gate line may be electrically connected to each other through a contact hole.

According to the embodiments of the present invention, a thicker metal wiring is formed through a trench defined by color filters, so that a low resistance wiring may be realized. Moreover, a light-blocking layer formed between the color filters is removed, so that an aperture ratio may be enhanced.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A display substrate comprising:
    a plurality of color filters formed on a base substrate;
    a gate line formed in a trench defined by at least one of the plurality of color filters and extended along a first direction;
    an insulation layer formed on the color filters and the gate line;
    a data line formed on the insulation layer and extended along a second direction crossing the first direction; and
    a plurality of pixel electrodes formed on the base substrate having the data line formed thereon.

2. The display substrate of claim 1, further comprising a switching element including a gate electrode electrically connected to the gate line, a source electrode electrically connected to the data line and a drain electrode electrically connected to each of the pixel electrodes.

3. The display substrate of claim 2, wherein the gate electrode and the gate line are integrally formed to be formed in the trench.

4. The display substrate of claim 1, wherein the color filters are extended along the second direction and arranged along the first direction.

5. The display substrate of claim 4, wherein the data line is formed in correspondence with an area where different color filters overlap each other.

6. The display substrate of claim 1, wherein the color filters are extended along the first direction and arranged along the second direction.

* * * * *